(12) United States Patent
Miura et al.

(10) Patent No.: US 8,496,859 B2
(45) Date of Patent: Jul. 30, 2013

(54) METHOD OF PRODUCING A PLASTIC POLARIZED LENS

(75) Inventors: Toru Miura, Nishitokyo (JP); Yoshimitsu Aiiso, Fukui (JP)

(73) Assignees: Mitsui Chemicals, Inc., Minato-Ku, Tokyo (JP); Hopnic Laboratory Co., Ltd., Sabae-Shi, Fukui (JP)

( * ) Notice: Subject to any disclaimer, the term of this patent is extended or adjusted under 35 U.S.C. 154(b) by 19 days.

(21) Appl. No.: 13/109,121

(22) Filed: May 17, 2011

(65) Prior Publication Data

US 2011/0215493 A1   Sep. 8, 2011

Related U.S. Application Data

(62) Division of application No. 11/882,875, filed on Aug. 6, 2007, now Pat. No. 7,967,434.

(60) Provisional application No. 60/839,121, filed on Aug. 22, 2006.

(30) Foreign Application Priority Data

Aug. 10, 2006   (JP) .................................. 2006-218973

(51) Int. Cl.
  *B29D 11/00*   (2006.01)
(52) U.S. Cl.
  USPC ........................... 264/1.32; 264/1.36; 264/1.7

(58) Field of Classification Search
  USPC ................ 264/1.32, 1.34, 1.31, 1.7, 2.5, 2.6, 264/1.36, 483; 425/808
  See application file for complete search history.

(56) References Cited

U.S. PATENT DOCUMENTS

| | | | |
|---|---|---|---|
| 6,220,703 B1 | 4/2001 | Evans et al. | |
| 7,767,304 B2 * | 8/2010 | Berzon | 428/424.2 |
| 8,187,712 B2 * | 5/2012 | Ryu et al. | 428/423.7 |
| 2001/0028436 A1 * | 10/2001 | Evans et al. | 351/163 |
| 2003/0144452 A1 | 7/2003 | Jallouli et al. | |
| 2005/0168690 A1 | 8/2005 | Kawai et al. | |

FOREIGN PATENT DOCUMENTS

| | | |
|---|---|---|
| CN | 1657975 A | 8/2005 |
| JP | 09-258009 A | 10/1997 |
| JP | 2002-267841 A | 9/2002 |
| WO | WO 02/073291 A1 | 9/2002 |
| WO | WO 2004/099859 A | 11/2004 |
| WO | WO 2007/020817 A1 | 2/2007 |

OTHER PUBLICATIONS

Office Action issued in corresponding Chinese Application 2007800269711 dated Dec. 18, 2009.

* cited by examiner

*Primary Examiner* — Mathieu D. Vargot
(74) *Attorney, Agent, or Firm* — Buchanan Ingersoll & Rooney PC

(57) ABSTRACT

A method of producing a plastic polarized lens with excellent processability and the like by injecting a mixture of a specified isocyanate compound and a specified active hydrogen compound into a lens-forming mold wherein a polarized film containing a thermoplastic polyester is fixed, followed by polymerization and curing.

3 Claims, 2 Drawing Sheets

METHOD OF PRODUCING A PLASTIC POLARIZED LENS

This application claims priority under 35 U.S.C. §121 as a division of U.S. patent application Ser. No. 11/882,875, filed Aug. 6, 2007, now U.S. Pat. No. 7,967,434, which claims priority under 35 U.S.C. §119 from U.S. Provisional Application Ser. No. 60/839,121, filed Aug. 22, 2006. This application is based on Japanese patent application No. 2006-218973, the content of which is incorporated hereinto by reference.

BACKGROUND

1. Technical Field

The present invention relates to a polarized lens and a method of producing the same.

2. Related Art

A polarized lens can prevent transmission of reflected light. Therefore, it is used for protecting eyes by intercepting a strong reflected light in outdoor such as in a skiing ground or in fishing, and for securing safety in driving a car by intercepting a reflected light from a car running in the opposite direction.

For a plastic polarized lens, two kinds of polarized lens are proposed, namely, a polarized lens with a polarized film laid on the surface of the lens material, and a sandwich structured polarized lens with a polarized film within the lens.

The polarized lens with a polarized film laid on the surface of the lens material (for example, Japanese Patent Application Laid-Open No. H09-258009) can make the thickness of the lens thin, but has a serious disadvantage that the polarized film is liable to be peeled off from the lens material during a periphery grinding process (a process of grinding periphery of the lens to fit in a predetermined shape).

A resin used for a polarized film composing a polarized lens has been essentially limited so far to polyvinyl alcohol. The polarized film is produced by a uniaxial extension of polyvinyl alcohol film after adding iodine or a dichroic dye to make a film having molecular orientation in uniaxial direction. A method of producing a polarized lens composed of a polarized polyvinyl alcohol film is disclosed, for example, in the WO 04/099859.

However, the polarized lens produced by using a polarized polyvinyl alcohol film has shortcomings of gradual penetration of water from the rim of the lens causing deterioration from the periphery to the center of the lens with time or due to the surrounding environment.

In order to improve above-mentioned shortcomings, the pamphlet of WO 02/073291 proposed a polarized lens using a lens material containing impact-resistant polyurethane resin obtained from diamine and isocyanate-prepolymer, and a polarized film containing polyethylene terephthalate.

However, this polarized lens has a disadvantage that the polarized film contained in the lens is clearly visible from outside which gives an uncomfortable feeling to a person who wears the eyeglasses containing this lens. Furthermore, as the composition of the mixture of diamine and isocyanate prepolymer has a high viscosity and a short pot life, injection of the composition to a lens mold with a fixed polarized film therein is troublesome, and production of a thin lens was particularly difficult.

Therefore, in the conventional plastic polarized lens, there has been a demand for a plastic polarized lens having reduced occurrence of peeling-off of the polarized film during a downstream process of grinding the periphery of the lens and excellent water-resistance, giving less uncomfortable feeling on wearing, and is capable of producing a thin product.

SUMMARY OF THE INVENTION

The present invention has been made to address the above problems in the conventional art, has an object to provide a plastic polarized lens with excellent processability and a method of producing the same.

According to the present invention, there is provided:

(1) A plastic polarized lens, comprising:
 a polarized film comprised of a thermoplastic polyester; and
 layers stacked on both surface of said polarized film,
 wherein said layers are comprised of the thiourethane-based resin being obtained by reacting;
 (A) one kind or two or more kinds of isocyanate compounds selected from the group consisting of a polyisocyanate compound, an isocyanate compound containing an isothiocyanate group and a polyisothiocyanate compound, and
 (B) one kind or two or more kinds of active hydrogen compounds selected from the group consisting of a thiol compound containing a hydroxyl group and a polythiol compound.

(2) The plastic polarized lens according to above (1),
 wherein the thermoplastic polyester is polyethylene terephthalate.

(3) The plastic polarized lens according to (1) or (2),
 wherein the polarized film is treated in advance by one or two or more processes selected from the group consisting of a treatment with silane coupling agent, a treatment with aqueous solution of sodium hydroxide, an atmospheric or vacuum plasma treatment, a corona discharge treatment, and a coating treatment with an urethane-based resin.

(4) The plastic polarized lens according to any of above (1) to (3),
 wherein the isocyanate compound (A) is a diisocyanate compound, and the active hydrogen compound (B) is a polythiol compound.

(5) The plastic polarized lens according to any of (1) to (4),
 wherein the isocyanate compound (A) is one kind or two or more kinds of diisocyanates selected from the group consisting of 2,5-bis(isocyanatomethyl)bicyclo[2.2.1]heptane, 2,6-bis(isocyanatomethyl)bicyclo[2.2.1]heptane, and m-xylylene diisocyanate, and
 the active hydrogen compound (B) is one kind or two or more kinds of polythiol compounds selected from the group consisting of pentaerythritol-tetrakis(3-mercaptopropionate), 4-mercaptomethyl-1,8-dimercapto-3,6-dithiaoctane, 5,7-dimercaptomethyl-1,1'-dimercapto-3,6,9-trithiaundecane, 4,7-dimercapto-methyl-1,1'-dimercapto-3,6,9-trithiaundecane, 4,8-dimercaptomethyl-1,11-dimercapto-3,6,9-trithiaundecane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithietane.

(6) The plastic polarized lens according to any of above (1) to (5),
 wherein refractive index at e-line of the above mentioned thiourethane resin is in the range of 1.57 to 1.70.

(7) The plastic polarized lens according to any of above (1) to (5),
 wherein refractive index at e-line of the above mentioned thiourethane resin is in the range of 1.59 to 1.70.

(8) A method of producing a plastic polarized lens, including:

fixing a polarized film comprised of a thermoplastic polyester in a lens-forming mold in a state separated from an inner wall of the mold;

injecting a mixture into a space between both surfaces of the polarized film and the inner wall of the mold; and stacking layers comprised of a thiourethane resin on both surfaces of the polarized film by polymerizing and curing the mixture, wherein the mixture contains:

(A) one kind or two or more kinds of isocyanate compounds selected from the group consisting of a polyisocyanate compound, an isocyanate compound having an isothiocyanate group and a polyisothiocyanate compound, and (B) one kind two or more kinds of active hydrogen compounds selected from the group consisting of a thiol compound having a hydroxyl group and a polythiol compound.

(9) The method of producing a plastic polarized lens according to above (8), wherein the thermoplastic polyester is polyethylene terephthalate.

(10) The method of producing a plastic polarized lens according to above (8) or (9), wherein said polarized film is treated in advance with one or two or more processes selected from the group consisting of a treatment with a silane coupling agent, a treatment with an aqueous solution of sodium hydroxide, an atmospheric or vacuum plasma treatment, a corona discharge treatment, and a coating treatment with an urethane based-resin.

(11) The method of producing a plastic polarized lens according to any of above (8) to (10), wherein the isocyanate compound (A) is a diisocyanate compound and the active hydrogen compound (B) is a polythiol compound.

(12) The method of producing a plastic polarized lens according to any of above (8) to (11), wherein the isocyanate compound (A) is one kind or two or more kinds of diisocyanates selected from the group consisting of 2,5-bis(isocyanatomethyl)bicyclo[2.2.1]heptane, 2,6-bis(isocyanatomethyl)bicyclo[2.2.1]heptane and m-xylylene diisocyanate, and the active hydrogen compound (B) is one kind or two or more kinds of polythiol compounds selected from the group consisting of pentaerythritol tetrakis(3-mercaptopropionate), 4-mercaptomethyl-1,8-dimercapto-3,6-dithiaoctane, 5,7-dimercaptomethyl-1,1'-dimercapto-3,6,9-trithiaundecane, 4,7-dimercapto-methyl-1,1'-dimercapto-3,6,9-trithiaundecane, 4,8-dimercaptomethyl-1,1'-dimercapto-3,6,9-trithiaundecane, 1,1,3,3-tetrakis(mercaptomethylthio)propane, 4,6-bis(mercaptomethylthio)-1,3-dithiane, and 2-(2,2-bis(mercaptomethylthio)ethyl-1,3-dithietane.

(13) The method of producing a plastic polarized lens according to any of above (8) to (12), wherein the viscosity of a mixture of the isocyanate compound (A) and the active hydrogen compound (B) at 20° C. is 200 mPa·s or less.

The plastic polarized lens of the present invention is excellent in processability. Therefore, it is useful particularly as a polarized lens for eyeglasses.

BRIEF DESCRIPTION OF THE DRAWINGS

The above and other objects, advantages and features of the present invention will be more apparent from the following description taken in conjunction with the accompanying drawings, in which.

DETAILED DESCRIPTION

The invention will be now described herein with reference to illustrative embodiments. Those skilled in the art will recognize that many alternative embodiments can be accomplished using the teachings of the present invention and that the invention is not limited to the embodiments illustrated for explanatory purposed.

In the following, the embodiments of the present invention will be described using drawings. In all the drawings, the same mark will be applied to the same composing unit, and the explanation will be abbreviated as appropriate.

Figure 1:
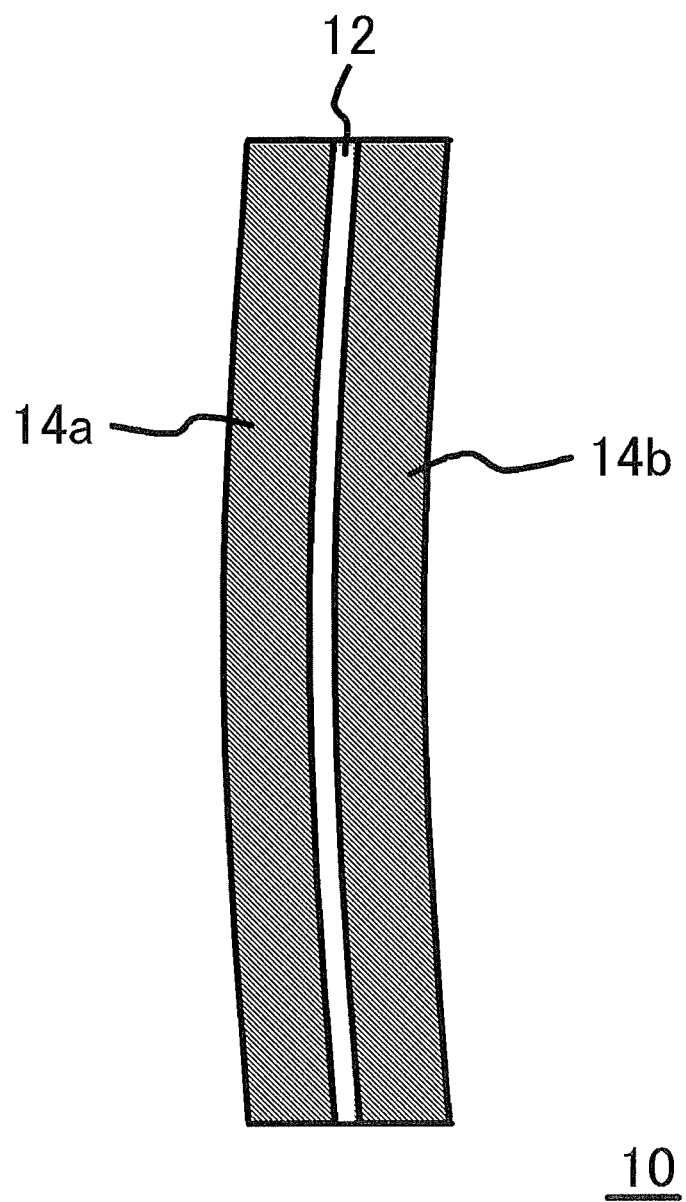
FIG. 1 shows a cross sectional view of a typical plastic polarized lens related to the embodiments of the present invention.

As shown in FIG. 1, the plastic polarized lens of the present invention (10) has thiourethane-based resin layers (lens material) (14a), (14b) which are formed on both surfaces of a polarized film (12) containing a thermoplastic polyester.

For the thermoplastic polyester, polyethylene terephthalate, polyethylene naphthalate, polybutylene terephthalate and the like may be specifically used, of which polyethylene terephthalate is preferable from view points of water resistance, heat resistance and mold processability. A polyester modified by addition of a copolymerization component and the like is also included.

A plastic polarized lens in which thiourethane-based resin layers are formed on both surfaces of a polarized film containing such thermoplastic polyester as described above, has excellent water resistance, suppressed uncomfortable feeling on wearing, capability of thinning of lens, and furthermore suppressed peeling-off of the polarized film during a downstream process of grinding the periphery. Namely, it is excellent in the balance of these characteristics.

The polarized film containing a thermoplastic polyester of the present invention is disclosed, for example, in Japanese Laid-open patent publication No. 2002-267841. Specifically, it is a polarized film having a matrix of a thermoplastic polyester, wherein the polarized film may be obtained by blending a dichroic dye in the thermoplastic polyester, molding it to a film, followed by uniaxial extension of the film obtained by molding, and subsequent heat treatment at a prescribed temperature. The thickness is normally in the range of 10 to 500 µm.

As the dichroic dye used in the present invention, publicly-known dyes may be used. Examples include those disclosed in Japanese Laid-open patent publication No. S61-087757, Japanese Laid-open patent publication No. S61-285259, Japanese Laid-open patent publication No. S62-270664, Japanese Laid-open patent publication No. S62-275163 and Japanese Laid-open patent publication No. H1-103667. Specifically, the dyes include an anthraquinone-based dye, a quinophthalone-based dye and an azo-based dye and the like. Those having heat resistance at molding of the thermoplastic polyester are preferable.

In the present invention, the polarized film of containing a thermoplastic polyester is normally used after forming it to a shape with a desired curvature by a known method.

Furthermore, a pretreated the polarized film may be used to improve adhesiveness of the polarized film with a thiourethane-based resin. The pretreatment methods include one or two or more kinds selected from treatment with primer coating, treatment with chemicals (gas or chemical solution), treatment with corona discharge, treatment with plasma, treatment with ultra violet irradiation, treatment with electron beam irradiation, treatment with surface roughening, and treatment with burning and the like. Among above pretreatments, one or two or more kinds selected from treatment with primer coating, treatment with chemicals, treatment with corona discharge, and treatment with plasma are particularly preferable. The pretreatment may be conducted before or after forming the film to a shape with a desired curvature.

Specific examples of the above-mentioned primer coating treatment include a coating treatment with silane coupling agent, a coating treatment with a resin which may contain silane coupling agent, and the like.

Examples of the silane coupling agent used for the primer coating treatment include a silane coupling agent with one or more substituted groups such as epoxy group, amino group, (metha)acroyl group, vinyl group, mercapto group, halogen group, imino group, isocyanate group or ureide group. Examples of a hydrolyzable group bonded to the silicon atom in the silane coupling agent include alkoxy group optionally having two or more oxygen atoms, alkylcarboxyl group, halogen group and the like, of which an alkoxy silane compound having alkoxy group optionally having two or more oxygen atoms is more preferable.

Specific examples include a silane coupling agent having an epoxy group such as γ-glycidoxy propyltrimethoxysilane, γ-glycidoxy propylmethyldiethoxysilane, β-(3,4-epoxycyclohexyl)ethyl trimethoxysilane, γ-glycidoxypropyl methyl diethoxysilane and the like; a silane coupling agent having an amino group such as γ-aminopropyl trimethoxysilane, γ-aminopropyl triethoxysilane, N-β-(aminoethyl)-γ-aminopropyl trimethoxysilane, N-β-(aminoethyl)-γ-aminopropyl methyldimethoxysilane, N-phenyl-γ-aminopropyl trimethoxysilane, bis[3-(trimethoxysilyl)propyl]amine, bis[3-(trimethoxysilyl)propyl]ethylenediamine and the like and a silane coupling agent having an amine hydrochloride of above-mentioned a silane coupling agent having an amino group; a silane coupling agent having a (metha)acryloxy group such as γ-methacryloxypropyl trimethoxysilane, γ-methacryloxy propylmethyl dimethoxy silane, γ-methacryloxypropyl triethoxysilane, γ-methacryloxypropylmethyl diethoxysilane, γ-methacryloxy propyltris(methoxyethoxy)silane, γ-acryloxypropyl trimethoxysilane and the like; a silane coupling agent having a vinyl group such as vinyl trimethoxysilane, vinyl triethoxysilane, vinyl trichlorosilane, vinyl tris(β-methoxyethoxy)silane, styrylethyl trimethoxysilane, allyltriethoxysilane and the like; a silane coupling agent having a mercapto group such as γ-mercaptopropyl trimethoxy silane, γ-mercaptopropylmethyl dimethoxysilane, γ-mercaptopropyl triethoxysilane and the like; a silane coupling agent having halogen such as γ-chloropropyl trimethoxysilane, γ-chloropropyl triethoxysilane and the like; a silane coupling agent having an isocyanate group such as γ-isocyanatopropyl trimethoxysilane, γ-isocyanatopropyl triethoxysilane and the like; a silane coupling agent having an ureido group such as γ-(ureidopropyl)trimethoxysilane, γ-(ureidopropyl)triethoxy silane and the like.

Among the above compounds, preferable silane coupling agents include γ-glycidoxypropyl trimethoxysilane, γ-aminopropyl trimethoxysilane, N-β-(aminoethyl)-γ-aminopropyl methyldimethoxysilane, N-phenyl-γ-aminopropyl trimethoxysilane, γ-methacryloxypropyl trimethoxysilane, γ-methacryloxy propylmethyl dimethoxysilane, γ-methacryloxypropyl triethoxysilane, γ-methacryloxypropylmethyl diethoxysilane, γ-methacryloxypropyl tris(methoxyethoxy)silane, γ-acryloxy propyl trimethoxysilane, vinyl trimethoxysilane, vinyl triethoxysilane, vinyl tris(β-methoxyethoxy) silane, γ-mercaptopropyl trimethoxysilane, γ-isocyanatopropyl trimethoxysilane and the like. Particularly preferable silane coupling agents include (metha)acryloxyalkylalkoxysilane such as γ-methacryloxy propyl trimethoxysilane, γ-methacryloxypropyl methyl dimethoxysilane, γ-methacryloxypropyl triethoxy silane, γ-methacryloxypropylmethyl diethoxysilane, γ-methacryloxy propyl tris(methoxyethoxy)silane, γ-acryloxy propyl trimethoxysilane, vinyl trichlorosilane and the like.

These compounds may be used alone or in a combination of two or more kinds, including a case where a chemical reaction takes place between different kinds of silane coupling agents.

When coating a silane coupling agent to the polarized film containing a thermoplastic polyester in the present invention, coating may be made directly without a solvent, but normally it is preferable to use a suitable solvent in which the silane coupling agent is dissolved or dispersed.

The solvent may be selected from water or alcohol compounds such as methanol, ethanol, isopropanol and the like, aromatic compounds such as toluene, xylene and the like, ester compounds such as ethyl acetate and the like, ketone compounds such as acetone, methylethyl ketone and the like, halogen compounds such as dichloromethane and the like. These solvents may be used alone or in a combination of two or more kinds. Among them, a combination liable to undergo a chemical reaction is included such as amino group and acetone, or isocyanate group and methanol, where a functional group in an organic group of a silane coupling agent may react with the solvent. Except the case where positive inclusion of the chemical reaction is preferable, a solvent which is chemically inactive with the functional group in the organic group is selected.

The silane coupling agent contains a hydrolyzable group such as alkoxide group bonded to a silicon atom, which forms a silanol group by hydrolysis reaction with water. Further, the silanol group undergoes dehydration condensation to proceed polymerization based on —Si—O—Si— bonding, and eventually precipitation of a polymer may occur if the polymerization proceeds excessively. A series of these reactions proceeds at a rate in accordance with the predetermined conditions. Although the silane coupling agent may be used for coating at any stage of the series of reactions including the initial stage where no hydrolysis has occurred, it is preferred that the silane coupling agent is used under a condition where hydrolysis proceeds partially and at the stage before substantial precipitation of the polymer due to the formation of —Si—O—Si— bonding proceeds.

In order to make a series of reactions starting from hydrolysis of a silane coupling agent by water to proceed appropriately, when a solvent other than water is used, there is used a coating liquid to which 1000 to 0.1 equivalent, preferably 100 to 0.5 equivalent, more preferably 10 to 0.5 equivalent, further preferably 2 to 0.5 equivalent of water is added per one equivalent of hydrolysis group.

Water contained in the solvent in which the silane coupling agent is dissolved or dispersed is also considered as the added water mentioned above. Addition of water may be made either by adding water to a high concentration solution of silane coupling agent and diluting it by adding the solvent to a predetermined concentration, or by using a solvent which contains desired amount of water. When the solvent is water, or depending on the amount of added water, or depending on the storage environment condition of the coating liquid, usable time as coating liquid is selected.

The concentration of the above coating liquid calculated as a silane coupling agent is 300 g to 0.01 g/L, preferably 30 g to 0.05 g/L, more preferably 5 g to 0.1 g/L. If the concentration exceeds 300 g/L, it is not only uneconomical due to use of an excess amount of the coating liquid, but also there may be a case in which an adhesive layer may become visible in the lens. When the coating liquid with the concentration exceeding 300 g/L is used, the above problem may be partially solved by washing the surface with a neat solvent, but there is no more advantage than in the case of performing coating within the above range of concentration. If the concentration calculated as a silane coupling agent is lower than 0.01 g/L, the amount of the silane coupling agent coated in one coating is not enough and there may be a problem of insufficient adhesion of a polarized film when the lens is molded. The amount of coating may be increased to a necessary level by repeated coating, but normally there is no more advantage than in the case of performing coating within the above range of concentration.

After coating the above coating liquid on both surfaces of the polarized film containing a thermoplastic polyester, the coated liquid on the film having fluidity may be removed as necessary, and subjected to drying. The drying temperature is not limited as long as it is 200° C. or lower, and it is normally in a range of 5 to 100° C., more preferably 10 to 80° C., most preferably 20 to 70° C., to prevent excessive condensation reaction of the silane coupling agent.

Although the drying time is not particularly limited and set in accordance with the solvent used and the environment conditions such as drying temperature and air blowing condition, normally in a range of 10 seconds to 60 minutes, preferably 20 seconds to 30 minutes is suitable.

Although the method of coating of the above coating liquid on both surfaces of the polarized film containing thermoplastic polyester is not particularly limited, it is largely classified into a method of forming a curvature of the polarized film after treatment with silane coupling agent, a method of applying a silane coupling treatment after forming a curvature, or a method of employing both of above methods in combination. Any of the above methods may be employed, and depending on each condition, conventionally known coating methods such as roll-coating method, spin-coating method, spray-coating method, bar-coating method, dipping method and the like may be used.

Repeated coating once or more after drying may be made, and in this case, the kind of coating liquid may be the same or different. Normally, the object of the present invention may be achieved in most cases by one-time coating and drying without repeated coating.

In the above solution or suspension of a silane coupling agent, in order to achieve a desired rate of curing by hydrolysis, a pH adjusting agent or a catalyst such as an organotin compound, an inorganic acid, or an organic acid may be added as necessary to the extent not disturbing the present invention.

Examples of a pH-adjusting agent include an organic acid such as acetic acid, oxalic acid, formic acid, citric acid and the like. These compounds may be used as necessary for the purpose of preservation stability of a silane coupling solution or suspension, adjustment of the usable time of the coated polarized film, or achieving a higher rate of curing by hydrolysis.

Specific examples other than the above-mentioned primer coating treatment include "coating treatment with a resin which may contain silane coupling agent" as mentioned above.

Specific examples of the resin include polyester-based resin, epoxy-based resin, urethane-based resin, acryl-based resin, cellulose-based resin. Among them, from the viewpoint of transparency, saturated or unsaturated polyester-based resin, and urethane-based resin are preferable, of which urethane-based resin is particularly preferable. The resin may be used together with a solvent, and examples of the solvent include organic solvent or water. When the solvent is water, resin may be emulsified or dispersed therein.

Before the above primer coating treatment, the polarized film may be treated in advance with one or two or more pretreatments selected from treatment with gas or chemical solution, treatment with corona discharge, treatment with plasma, treatment with ultra violet irradiation, treatment with electron beam irradiation, treatment with surface roughening, treatment with burning and the like.

The method of coating a polarized film with the resin used for the above-mentioned primer coating treatment is not particularly limited, and conventionally-known methods such as roll-coating method, spin-coating method, spray-coating method, bar-coating method and dipping method may be employed.

Prior to the coating with resin, the polarized film may be treated in advance with one or two or more pretreatments selected from treatment with gas or chemical solution, treatment with corona discharge, treatment with plasma, treatment with ultra violet irradiation, treatment with electron beam irradiation, treatment with surface roughening, treatment with burning, and the like.

After coating the polarized film with the resin used for the primer coating treatment, drying and/or heat treatment are applied if necessary. The temperature for drying and/or heat treatment is not particularly limited as long as it is within the range where the polarized film property is not essentially deteriorated. After coating the polarized film with the resin, active energy beam such as ultra violet beam or electron beam may be irradiated.

The polyester-based resin used for the above-mentioned primer coating treatment is a copolymerized polyester composed of a constitutional unit derived from dicarboxylic acid and a constitutional unit derived from glycol. Examples of dicarboxylic acid include aliphatic based, aromatic based, aliphatic/aromatic based (containing aromatic ring and aliphatic chain) dicarboxylic acid or the like, which may contain functional group. Examples of the functional group include sulfonic acid group and its alkaline metal salt, or its ammonium salt. One or two or more dicarboxylic acid may be selected for use from the above examples.

Examples of dicarboxylic acid without functional group include aromatic dicarboxylic acids such as isophthalic acid, phthalic acid, naphthalene dicarboxylic acid, and diphenyl dicarboxylic acid; aliphatic dicarboxylic acid such as adipic acid, azelaic acid, and sebacic acid; alicyclic dicarboxylic acids such as 1,3-cyclohexane dicarboxylic acid, and 1,4-cyclohexane dicarboxylic acid; and the like. One or two or more of those dicarboxylic acids may be selected for use from the above examples.

Examples of glycol as monomer for the above-mentioned polyester-based resin include aliphatic based, aromatic based, aliphatic/aromatic based (containing aromatic ring and aliphatic chain) glycols and the like. Among them, aliphatic-based glycol is particularly preferable. Specific examples of aliphatic-based glycol include ethylene glycol, 1,2-propanediol, 1,3-propanediol, 1,4-butanediol, 1,5-pentanediol, 1,6-hexanediol, neopentylglycol, tri-methylol propane, an ethylene oxide adduct of bisphenol A and the like. One or two or more glycols may be selected for use from the above examples.

Urethane-based resins used for the above-mentioned primer coating treatment is a polymer composed of a constitutional unit derived from polyhydroxy compound and a constitutional unit derived from polyisocyanate. Examples of the polyhydroxy compound include polyesterdiol, polyetherdiol, polythioetherdiol, polylactonediol, polyacetaldiol and the like. Among them polyesterdiol and polyetherdiol are particularly preferable.

Examples of the above-mentioned polyesterdiol include polyesters having hydroxyl group at the end of the chain which is obtained by reaction of saturated polyhydric alcohols as exemplified by ethylene glycol, propylene glycol, butylene glycol, diethylene glycol, neopentyl glycol, hexamethylene glycol, trimethylol propane and the like, or diols of unsaturated polyhydric alcohol as exemplified by butenediol and the like, or their mixture using polyhydric alcohol and the like as raw material with organic dicarboxylic acid including saturated aliphatic acids such as adipic acid and sebacic acid, unsaturated aliphatic acids such as maleic acid and fumaric acid, aromatic carboxylic acids such as isophthalic acid, phthalic acid and terephthalic acid, and their anhydrides, or their mixture; polyester obtained by ring-opening polymerization of lactones such as caprolactam or methylcaprolactone with diols; or the like.

Specific examples of the above-mentioned polyetherdiol include a polymer or a copolymer having hydroxy group at the end of the chain, which is obtained by ring-opening polymerization or ring-opening copolymerization of ethylene oxide, propylene oxide, epichlorohydrin, oxacyclobutane, substituted oxacyclobutane, tetrahydrofuran or the like; their mixtures or the like.

Examples of polyisocyanate as monomer of the above-mentioned urethane-based resin include 1,4-tetramethylene diisocyanate, 1,6-hexamethylene diisocyanate, 1,8-octamethylene diisocyanate, 1,10-decamethylene diisocyanate, 1,4-cyclohexylene-diisocyanate, toluene diisocyanate, 1,3-phenylene diisocyanate, 4,4'-methylene bis(cyclohexyl isocyanate), 4,4'-diphenylmethane diisocyanate, isophorone diisocyanate, triphenylmethane triisocyanate and the like. One or two or more polyisocyanates may be selected for use from the above examples.

Specific examples of the above-mentioned treatment with chemicals include gas treatment using a gas such as ozone, halogen gas, and chlorine dioxide; or chemical solution treatment using oxidizing agent, reducing agent, acid or base such as sodium hypochlorite, alkaline metal hydroxide, alkaline-earth metal hydroxide, metallic sodium, sulfuric acid, nitric acid. For chemical solution treatment, oxidizing agent, reducing agent, acid or base is normally used as a solution in water, alcohol or liquid ammonia.

When the above-mentioned chemicals for treatment is alkaline metal hydroxide and/or alkaline earth-metal hydroxide, examples of the alkaline metal hydroxide include lithium hydroxide, sodium hydroxide, potassium hydroxide and the like; examples of the alkaline earth-metal hydroxide include magnesium hydroxide, calcium hydroxide, barium hydroxide and the like. One or two or more chemicals may be selected from the above examples for use. Among them, sodium hydroxide and potassium hydroxide are preferable, of which sodium hydroxide is particularly preferable.

Alkaline metal hydroxide and/or alkaline earth-metal hydroxide is preferably used in its solution. Examples of the solvent include water and/or organic solvent, and examples of the organic solvent include methanol, ethanol and isopropanol.

The concentration of the above-mentioned solution is in the range of 5 to 55 wt %, preferably 10 to 45 wt %. The temperature of the solution is 0 to 95° C., preferably 20 to 90° C., more preferably 30 to 80° C.

The pretreatment with alkaline metal hydroxide and/or alkaline earth-metal hydroxide solution may be performed by contacting the solution in the present invention within the above-mentioned range of concentration and temperature with one side or both sides of the polarized film for a predetermined time. Although the method of contact is not particularly limited, examples are the contact by dipping the polarized film in a solution, or by showering a solution, or by flowing down a solution on the surface. Among them, dipping the polarized film in a solution is preferable. In order to provide homogeneous concentration and temperature of a solution, methods such as agitation, convection, or jet flow may be employed. Although the time necessary for contact is not particularly limited, it is in the range of 1 minute to 24 hours, preferably 5 minutes to 10 hours, particularly preferably 5 minutes to 5 hours.

For contacting the above-mentioned alkaline metal hydroxide and/or alkaline earth-metal hydroxide solution with the polarized film, a physical stimulus such as supersonic irradiation or vibration may be applied in combination.

The alkaline metal hydroxide and/or alkaline earth-metal hydroxide solution may contain an anionic or nonionic surfactant to improve wettability between the solution and the polarized film.

For the contact of the above-mentioned alkaline metal hydroxide and/or alkaline earth-metal hydroxide solution with the polarized film, the concentration and temperature of the solution and the contact time may be suitably selected, as long as optical properties of the polarized film is not substantially impaired.

After the above-mentioned alkaline metal hydroxide and/or alkaline earth-metal hydroxide solution are/is contacted with the polarized film, the polarized film is taken out from the solution, and may be washed and dried, if necessary, with water and/or an organic solvent such as methanol, ethanol, isopropanol, acetone and methylethylketone.

The above-mentioned corona discharge treatment is a kind of gas discharge, utilizing a phenomenon of ionization of gas molecule which causes electric conductivity of gas, and the resultant ionic flow activates the film surface. It is a technology widely used for surface treatment. An example of the gas for discharge treatment is air, but it may be also a gas such as nitrogen, carbon dioxide, or ammonia gas. The corona discharge treatment of the polarized film surface can be accomplished, for example, using corona generated by applying voltage to the electrodes of a known high frequency generator. Power intensity of the corona discharge treatment is preferably 1 to 500 W·min/m$^2$, more preferably 5 to 400 W·min/m$^2$.

As for the examples of the above-mentioned plasma treatment, there are atmospheric plasma treatment and vacuum plasma treatment (low temperature plasma treatment).

In the atmospheric plasma treatment, discharge treatment is conducted in the presence of gas such as air, steam, argon, nitrogen, helium, carbon dioxide and carbon monoxide, alone or in their mixture.

The vacuum plasma treatment may be conducted under vacuum. For example, surface treatment may be conducted by placing the polarized film in an internal electrode type discharge treatment unit equipped with a drum-like electrode and the counter electrode composed of multiple rod-like electrodes, in the presence of the treatment gas of 0.001 to 50 Torr, preferably 0.01 to 10 Torr, more preferably 0.02 to 1 Torr, and by exposing the surface of the polarized film to the plasma of the treatment gas generated by applying high direct current or alternating current voltage between the electrodes. Although the treatment conditions of the vacuum plasma treatment depend on the factors such as the treatment equipment, the kinds of the treatment gas, the pressure, and the frequency of the power supply source, suitable conditions may be selected. Examples of the above-mentioned treatment gas include argon, nitrogen, helium, carbon dioxide, carbon monoxide, air, steam and the like, which may be used alone or in combination.

In the present invention, among the above-mentioned pretreatment methods, the polarized film is preferably treated by one or two or more methods selected from the group consisting of a treatment with silane coupling agent, a treatment with sodium hydroxide aqueous solution, an atmospheric or vacuum pressure plasma treatment, a corona discharge treatment, and a coating treatment with urethane-based resin.

By this means, the adhesion between the polarized film and thiourethane-based resin may be further improved.

Figure 2:
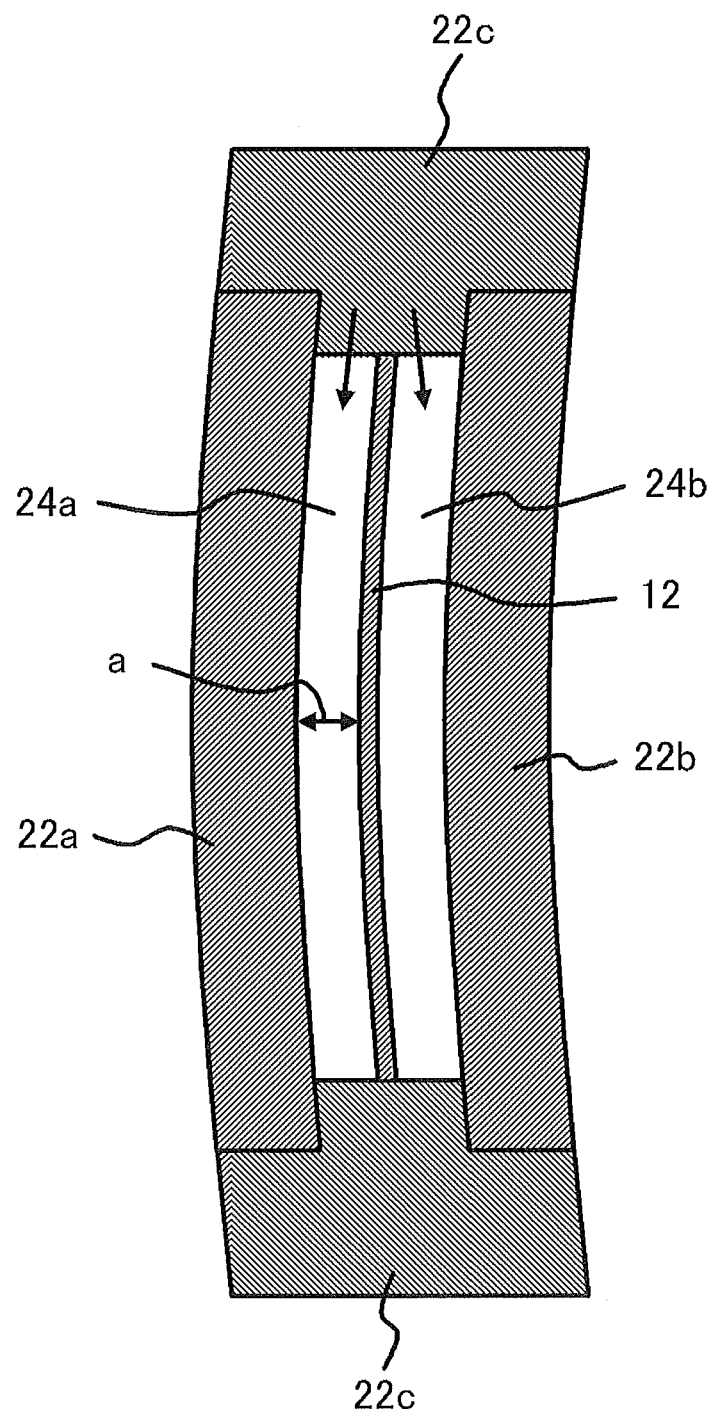
FIG. 2 shows a cross sectional view of a typical lens-forming mold related to the embodiments of the present invention.

The plastic polarized lens of the present invention is obtained by injecting a mixture of a specified isocyanate compound and a specified active hydrogen compound into a lens-forming mold (20)
wherein a polarized film containing a thermoplastic polyester (12) is fixed as shown in FIG. 2, followed by polymerization and curing.

As mentioned above, the polarized film (12) may be pretreated with a silane coupling agent. In this case, there may be a step for coating the polarized film with a coating liquid in which the silane coupling agent is dissolved or suspended before the polarized film (12) containing a thermoplastic polyester is fixed
wherein the polarized film is separated from an inner surface of the mold.

The lens-forming mold (20) is generally composed of two molds (22*a*) and (22*b*) held together by a gasket (22*c*).

For a material of the gasket (22*c*), polyvinyl chloride, an ethylene-vinyl acetate copolymer, an ethylene-ethyl acrylate copolymer, an ethylene-propylene copolymer, an ethylene-propylene-diene copolymer, a polyurethane elastomer, a fluorinated rubber or a soft elastic resins formed by blending polypropylene with the above compounds is used. The material preferably does not swell nor dissolve in a mixture of a specified isocyanate compound and a specified active hydrogen compound used in the present invention.

A material for the mold (22*a*) and (22*b*) may be glass or metal, and normally glass is used. For the mold (22*a*) and (22*b*), a mold releasing agent may be applied in advance for easy releasing of the lens to be obtained. Furthermore, a coating liquid may be applied to provide a hard coat property to the lens.

Into a space in the lens-forming mold (20), the polarized film containing a thermoplastic polyester (12) is arranged so that the surface of the film is made parallel to the internal surface of the front side mold (22*a*), which faces the surface of the film. Between the polarized film (12) and each of the molds (22*a*) and (22*b*), spaces of (24*a*) and (24*b*) are formed. The narrowest distance (a) of the spaces (24*a*) and (24*b*) is approximately 0.2 to 2.0 mm.

In the present invention, a mixture of the isocyanate compound (A) and the active hydrogen compound having thiol group (B) is used so that the viscosity during injection is kept low, and the mixture is easily injected into such narrow spaces as mentioned above.

Subsequently, in the space of lens-forming mold (20), a mixture of a specified isocyanate compound (A) and a specified active hydrogen compound (B) is injected into the two spaces between molds (22*a*) and (22*b*) and the polarized film (12) by a predetermined injection method.

The isocyanate compound (A) used in the present invention contains a compound having an isothiocyanate group, specifically one kind or two or more kinds of compounds selected from a polyisocyanate compound, an isocyanate compound having a isothiocyanate group, and a polyisothiocyanate compound.

Examples of the polyisocyanate compound include, but not limited to, aliphatic polyisocyanate compounds such as hexamethylene diisocyanate, 2,2,4-trimethylhexane diisocyanate, 2,4,4-trimethylhexamethylene diisocyanate, lysine diisocyanatomethyl ester, lysine triisocyanate, m-xylylene diisocyanate, α,α,α',α'-tetramethylxylylene diisocyanate, bis(isocyanatomethyl)naphthalene, mesitylylene triisocyanate, bis(isocyanatomethyl)sulfide, bis(isocyanatoethyl)sulfide, bis(isocyanatomethyl)disulfide, bis(isocyanatoethyl)disulfide, bis(isocyanatomethylthio)methane, bis(isocyanatoethylthio)methane, bis(isocyanatoethylthio)ethane, bis(isocyanatomethylthio)ethane and the like; alicyclic polyisocyanate compounds such as isophorone diisocyanate, bis(isocyanatomethyl)cyclohexane, dicyclohexylmethane diisocyanate, cyclohexane diisocyanatomethylcyclohexane diisocyanate, dicyclohexyl dimethylmethane isocyanate, 2,5-bis(isocyanatomethyl)bicyclo[2.2.1]heptane, 2,6-bis(isocyanatomethyl)bicyclo[2.2.1]heptane, 3,8-bis(isocyanatomethyl)tricyclodecane, 3,9-bis(isocyanatomethyl)tricyclodecane, 4,8-bis(isocyanatomethyl)tricyclodecane, 4,9-bis(isocyanatomethyl)tricyclodecane and the like; aromatic polyisocyanate compounds such as phenylene diisocyanate, tolylene diisocyanate, 4,4-diphenylmethane diisocyanate, diphenylsulfide-4,4-diisocyanate and the like; and heterocyclic polyisocyanate compounds such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane and the like.

Examples of the isocyanate compound having an isothiocyanate group include polyisocyanate compounds having an isocyanate group mentioned above which is partially substituted with an isothiocyanate group; although it is not limited to these examples.

Examples of the polyisothiocyanate compound include, but not limited to, aliphatic polyisothiocyanate compounds such as hexamethylene diisocyanate, lysine diisothiocyanate methylester, lysine triisothiocyanate, m-xylylene diisocyanate, bis(isothiocyanate methyl)sulfide, bis(isothiocyanate ethyl)sulfide, bis(isothiocyanatoethyl)disulfide and the like; alicyclic polyisothiocyanate compounds such as isophorone diisothiocyanate, bis(isothiocyanate methyl)cyclohexane, dicyclohexylmethane diisothiocyanate, cyclohexane diisothiocyanate, methylcyclohexane diisothiocyanate, 2,5-bis(isothiocyanate methyl)bicyclo[2.2.1]heptane, 2,6-bis(isothiocyanate methyl)bicyclo[2.2.1]heptane, 3,8-bis(isothiocyanate methyl)tricyclodecane, 3,9-bis(isothiocyanate methyl)tricyclodecane, 4,8-bis(isothiocyanate methyl)tricyclodecane, 4,9-bis(isothiocyanate methyl)tricyclodecane and the like; aromatic polyisothiocyanate compounds such as tolylene diisothiocyanate, 4,4-diphenylmethane diisothiocyanate, diphenyldisulfide-4,4-diisothiocyanate and the like; and sulfur-containing heterocyclic polyisothiocyanate compounds such as 2,5-diisothiocyanate thiophene, 2,5-bis(isothiocyanate methyl)thiophene, 2,5-diisothiocyanate tetrahydrothiophene, 2,5-bis(isothiocyanate methyl)tetrahydrothiophene, 3,4-bis(isothiocyanate methyl)tetrahydrothiophene, 2,5- diisocyanato-1,4-dithiane, 2,5-bis(isothiocyanate methyl)-1,4-dithiane, 4,5-diisothiocyanate 1,3-dithiolane, 4,5-bis(isothiocyanate methyl)-1,3-dithiolane and the like.

Furthermore, the above isocyanate compounds substituted with halogen such as chlorine, bromine and the like, with an alkyl group, an alkoxy group, a nitro group, or modified with polyhydric alcohol prepolymer, carbodiimide, urea, biuret, or a dimerization or trimerization reaction product of the isocyanate compounds may be used. Such isocyanate compounds may be used alone or in a combination of two or more.

Among above isocyanate compounds, the diisocyanate compound is preferably used because of availability, price and property of the product resin. Preferable examples include hexamethylene diisocyanate, isophorone diisocyanate, bis(isocyanatomethyl)cyclohexane, dicyclohexylmethane diisocyanate, 2,5-bis(isocyanatomethyl)bicyclo[2.2.1]heptane, 2,6-bis(isocyanatomethyl)bicyclo[2.2.1]heptane, m-xylylene diisocyanate and 2,5-bis(isocyanatomethyl)-1,4-dithiane. Particularly preferable examples include 2,5-bis(isocyanatomethyl)bicyclo[2.2.1]heptane, 2,6-bis(isocyanatomethyl)bicycle-[2.2.1]-heptane and m-xylylene diisocyanate.

The active hydrogen compound (B) used in the present invention is one kind or two or more kinds of active hydrogen compounds selected from thiol or polythiol compounds having a hydroxyl group.

Examples of the thiol compound having a hydroxyl group include, but not limited to, 2-mercaptoethanol, 3-mercapto-1,2-propanediol, glycerin bis(mercaptoacetate), 4-mercaptophenol, 2,3-dimercapto-1-propanol, pentaerythritol tris(3-mercaptopropionate), pentaerythritol tris(thioglycolate) and the like.

Examples of the polythiol include, but not limited to, aliphatic polythiols such as methane dithiol, 1,2-ethane dithiol, 1,2,3-propane trithiol, 1,2-cyclohexane dithiol, bis(2-mercaptoethyl)ether, tetrakis(mercaptomethyl)methane, diethyleneglycol bis(2-mercaptoacetate), diethyleneglycol bis(3-mercaptopropionate), ethyleneglycol bis(2-mercaptoacetate), ethyleneglycol bis(3-mercaptopropionate), trimethylolpropane tris(2-mercaptoacetate), trimethylolpropane tris(3-mercapto propionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), bis(mercaptomethyl)sulfide, bis(mercaptomethyl)disulfide, bis(mercaptoethyl)sulfide, bis(mercaptoethyl)disulfide, bis(mercaptopropyl)sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropylthio)ethane, 1,2,3-tris(mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,1'-dimercapto-3,6,9-trithiaundecane, 4,7-dimercaptomethyl-1,1'-dimercapto-3,6,9-trithiaundecane, 4,8-dimercaptomethyl-1,11 dimercapto-3,6,9-trithiaundecane, tetrakis(mercapto methyl thiomethyl)methane, tetrakis(2-mercaptoethyl thiomethyl)methane, tetrakis(3-mercaptopropylthiomethyl)methane, bis(2,3-dimercaptopropyl)sulfide, 2,5-dimercaptomethyl-1,4-dithiane, 2,5-dimercapto-1,4-dithiane, 2,5-dimercaptomethyl-2,5-dimethyl-1,4-dithiane and their esters with thioglycolic acid and mercaptopropionic acid, hydroxymethylsulfide bis(2-mercaptoacetate), hydroxymethylsulfide bis(3-mercaptopropionate), hydroxyethylsulfide bis(2-mercaptoacetate), hydroxyethylsulfide bis(3-mercapto propionate), hydroxymethyldisulfide bis(2-mercaptoacetate), hydroxymethyldisulfide bis(3-mercaptopropionate), hydroxyethyldisulfide bis(2-mercaptoacetate), hydroxyethyl disulfide bis(3-mercaptopropionate), 2-mercaptoethylether bis(2-mercaptoacetate), 2-mercaptoethyl ether bis(3-mercapto propionate), thiodiglycolic acid bis(2-mercaptoethyl ester), thiodipropionic acid bis(2-mercaptoethyl ester), dithiodiglycolic acid bis(2-mercaptoethyl ester), dithiodipropionic acid bis(2-mercaptoethyl ester), 1,1,3,3-tetrakis(mercaptomethylthio)propane, 1,1,2,2-tetrakis(mercaptomethylthio)ethane, 4,6-bis(mercaptomethylthio)-1,3-dithia cyclohexane, tris(mercaptomethylthio)methane, tris(mercaptoethylthio)methane and the like; aromatic polythiol compounds such as 1,2-dimercaptobenzene, 1,3-dimercaptobenzene, 1,4-dimercaptobenzene, 1,2-bis(mercaptomethyl)benzene, 1,3 bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,3,5-trimercaptobenzene, 1,3,5-tris(mercaptomethyl)benzene, 1,3,5-tris(mercaptomethyleneoxy)benzene, 1,3,5-tris(mercaptoethyleneoxy)benzene, 2,5-toluene dithiol, 3,4-toluene dithiol, 1,5-naphthalene dithiol, 2,6-naphthalene dithiol and the like; heterocyclic thiol compounds such as 2-methylamino-4,6-dithiol-syn-triazine, 3,4-thiophene dithiol, bismuthiol, 4,6-bis(mercaptomethylthio)-1,3-dithiane and 2-(2,2-bis(mercaptothio)ethyl)-1,3-dithietane.

Furthermore, an oligomer of the above active hydrogen compounds or those substituted with halogen such as chlorine, bromine and the like may be used. These active hydrogen compounds may be used alone or in a combination of two or more.

Among the above active hydrogen compounds, the polythiol compound is preferably used because of availability, price and property of the product resin. Preferable examples include pentaerythritol tetrakis(2-mercaptoacetate), pentaerythritol tetrakis(3-mercaptopropionate), bis(mercaptoethyl)sulfide, 4-mercaptomethyl-1,8-dimercapto-3,6-dithiaoctane, 5,7-dimercaptomethyl-1,1'-dimercapto-3,6,9-trithiaundecane, 4,7-dimercaptomethyl-1,1'-dimercapto-3,6,9-trithiaundecane, 4,8-dimercaptomethyl-1,1'-dimercapto-3,6,9-trithiaundecane, 2,5-dimercaptomethyl-1,4-dithiane, 1,1,3,3-tetrakis(mercaptomethylthio)propane, 4,6-bis(mercaptomethylthio)-1,3-dithiane and 2-(2,2-bis(mercaptomethylthio)ethyl)-1,3-dithietane; particularly preferable examples include pentaerythritol tetrakis(3-mercaptopropionate), 4-mercaptomethyl-1,8-dimercapto-3,6-dithiaoctane, 5,7-dimercaptomethyl-1,1'-dimercapto-3,6,9-trithia undecane, 4,7-dimercaptomethyl-1,1'-dimercapto-3,6,9-trithiaundecane, 4,8-dimercaptomethyl-1,1'-dimercapto-3,6,9-trithia undecane, 1,1,3,3-tetrakis(mercaptomethylthio)propane, 4,6-bis(mercaptomethylthio)-1,3-dithiane and 2-(2,2-bis(mercaptomethylthio)ethyl)-1,3-ditietane.

The isocyanate compound (A) used in the present invention may be preliminarily reacted in advance with a part of the active hydrogen compound (B). Furthermore, the active hydrogen compound (B) used in the present invention may be preliminarily reacted in advance with a part of the isocyanate compound (A).

Furthermore, in addition to the isocyanate compound (A) and the active hydrogen compound (B), in order to modify the resin, a resin modifier such as a hydroxy compound, an epoxy compound, an episulfide compound, an organic acid and its anhydride, an olefin compound including (metha)acrylate compound may be added. The resin modifier is a compound which improves physical properties such as refractive index, Abbe's number, heat resistance, specific gravity, and mechanical strength such as impact strength of thiourethane-based resin.

Examples of the hydroxy compound used as the resin modifier include diethylene glycol, triethylene glycol, dipropylene glycol, tripropylene glycol, 1,4 butanediol, thiodiethanol, dithiodiethanol, glycerin, trimethylol propane, pentaerythritol, and an oligomer of these compounds, although it is not limited to these compounds.

Examples of the epoxy compound which may be added as the resin modifier include, but not limited to, a phenol-based epoxy compound obtained by condensation reaction of a polyhydric phenol such as bisphenol A-glycidyl ether and the like with an epihalohydrin compound;
an alcohol-based epoxy compound obtained by condensation reaction of a polyhydric alcohol such as hydrogenated bisphenol A-glycidyl ether and the like with an epihalohydrin compound;
a glycidyl ester-based epoxy compound obtained by condensation reaction of a multivalent organic acid compound such as 3,4-epoxycyclohexylmethyl-3',4'-epoxycyclohexane carboxylate and the like with an epihalohydrin compound;
an amine-based epoxy compound obtained by condensation reaction of a primary or secondary diamine compound with an epihalohydrin compound; and
an aliphatic multivalent epoxy compound such as vinylcyclohexene diepoxide and the like.

Examples of the episulfide compound which may be added as the resin modifier include, but not limited to, a linear aliphatic 2,3-epithiopropylthio compound such as bis(2,3-epithiopropylthio)sulfide, bis(2,3-epithiopropylthio)disulfide, bis(2,3-epithiopropylthio)methane, 1,2-bis(2,3-epithiopropylthio)ethane, 1,5-bis(2,3-epithiopropylthio)-3-thiapentane and the like;
a 2,3-epithiopropylthio compound having an alicyclic or heterocyclic ring such as 1,3-bis(2,3-epithiopropylthio)cyclohexane, 2,5-bis(2,3-epithiopropylthiomethyl)-1,4-dithiane and the like; and an aromatic 2,3-epithiopropylthio compound such as 1,3-bis(2,3-epithiopropylthio)benzene, 1,4-bis(2,3-epithiopropylthio)benzene and the like.

Examples of the organic acid and its anhydride which may be added as the resin modifier include, but not limited to, thioglycolic acid, thiodipropionic acid, dithiodipropionic acid, phthalic anhydride, hexahydrophthalic anhydride, methylhexahydrophthalic anhydride, methyltetrahydrophthalic anhydride, maleic anhydride, trimellitic anhydride, pyromellitic anhydride and the like.

Examples of the olefinic compound which may be added as the resin modifier include, but not limited to, (metha)acrylate compounds such as benzyl acrylate, benzyl methacrylate, cyclohexyl acrylate, cyclohexyl methacrylate, 2-hydroxylethyl acrylate, 2-hydroxymethyl methacrylate, glycidyl acrylate, glycidyl methacrylate, phenoxyethyl acrylate, phenoxyethyl methacrylate, phenyl methacrylate, ethylene glycol diacrylate, ethyleneglycol dimethacrylate, diethylene glycol diacrylate, diethyleneglycol dimethacrylate, triethyleneglycol diacrylate, triethyleneglycol dimethacrylate, neopentylglycol diacrylate, neopentylglycol dimethacrylate, ethyleneglycol bisglycidyl acrylate, ethyleneglycol bisglycidyl methacrylate, bisphenol A diacrylate, bisphenol A dimethacrylate, bisphenol F diacrylate, bisphenol F dimethacrylate, trimethylolpropane triacrylate, trimethylolpropane trimethacrylate, glycerol diacrylate, glycerol dimethacrylate, pentaerythritol triacrylate, pentaerythritol tetracrylate, pentaerythritol tetramethacrylate, xylenedithiol diacrylate, xylenedithiol dimethacrylate, mercaptoethylsulfide diacrylate, mercaptoethylsulfide dimethacrylate and the like; allyl compounds such as allylglycidyl ether, diallylphthalate, diallylterephthalate, diallylisophthalate, diethyleneglycol bisallylcarbonate and the like; and vinyl compounds such as styrene, chlorostyrene, methylstyrene, bromostyrene, dibromostyrene, divinylbenzene, 3,9-divinylspirobi(m-dioxane) and the like.

These resin modifiers may be used alone or in a combination of two or more.

The ratio of the isocyanate compound (A) and the active hydrogen compound (B) (including the hydroxy compound as the modifier) used in the present invention in terms of the molar ratio of functional groups (NCO+NCS)/(SH+OH) is normally in the range of 0.8 to 1.5, preferably in the range of 0.9 to 1.2.

The isocyanate compound (A) and the active hydrogen compound (B) used in the present invention are selected in consideration of availability, price, easiness of handling and property of the product resin.
A particularly important factor for easiness of handling is the viscosity of a mixture during injection. The viscosity during injection is determined by the combination of the isocyanate compound (A) and the active hydrogen (B) (when the resin modifier is used, the kind and amount of the modifier are included. Further, when a catalyst is used, the kind and amount of the catalyst are included). If the viscosity is too high, injection into the narrow spaces (24a) and (24b) between the glass molds (22a), (22b) in the lens-forming mold (20) and the polarized film (12) becomes difficult and production of the polarized lens becomes difficult. Normally, a preferable viscosity at 20° C. is 200 mPa·s or less, and for producing a lens with very thin center thickness, further lower viscosity such as 100 mPa·s or less is preferable. The viscosity of a mixture is measured using a B-type viscometer at a liquid temperature of 20° C.

An important property of the resin to be considered is the refractive index, and the resin with a high refractive index is preferably used. For example, used is a combination of an isocyanate compound (A) and an active hydrogen compound (B) (when a resin modifier is used, the kind and amount of the modifier are included) having a refractive index as measured with e-line normally in the range of 1.57 to 1.70, preferably in the range of 1.59 to 1.70, more preferably in the range of 1.65 to 1.68. If the refractive index is too low, the film in the polarized lens becomes clearly visible which makes a poor presentation.

As a mixture of an isocyanate compound (A) and an active hydrogen compound (B) used in the present invention, normally the same mixture is used for both sides of the polarized film, but different mixtures may also be used.

For curing a mixture of an isocyanate compound (A) and an active hydrogen compound (B) in the mold, according to known methods of molding, a catalyst such as dibutyltin dichloride, an ultraviolet absorber such as a benzotriazole compound, a mold releasing agent such as acidic phosphate ester, a photostabilizer, an antioxidant, a reaction initiator such as a radical reaction initiator, a chain-length extender, a crosslinking agent, an anticoloring agent, an oil soluble dyestuff, a filler and the like may be added if necessary.

For preparation of an injection mixture by mixing an isocyanate compound (A) and an active hydrogen compound (B) with other additives, the addition of a catalyst, a mold releasing agent and other additives may be performed by dissolving them in the isocyanate compound (A), or in the active hydrogen compound (B) in advance, or in the mixture of the isocyanate compound (A) and the active hydrogen (B), depending on the solubility of these compounds. Alternatively, a master solution is prepared by dissolving them in a part of the isocyanate compound (A) or the active hydrogen compound (B) and then the master solution may be added subsequently. The order of addition is not limited to the examples shown here, and selected suitably in consideration of handling easiness, safety, convenience and others.

Mixing is conducted normally at a temperature of 30° C. or less. It is sometimes preferable to employ a further lower temperature in consideration of the pot life of the mixture. When solubility of the additives such as a catalyst and a mold releasing agent in the isocyanate compound (A) or the active hydrogen compound (B) is poor, there may be also a case where the additives are dissolved in the isocyanate compound (A), the active hydrogen compound (B) or their mixture by heating in advance.

Furthermore, depending on the requirement for physical properties of the plastic lens, degassing under vacuum, or filtration under pressure or vacuum may be preferably employed as necessary.

Subsequently, after injection of a mixture of the isocyanate compound (A) and the active hydrogen compound (B) into a lens-forming mold in which a polarized film is fixed, the lens mold is heated in an oven or in an apparatus equipped with a heater, such as a water bath according to a preset temperature program for curing in several hours or several tens of hours.

Although the curing temperature is difficult to be specified since the conditions of curing depend on the composition of the mixture, the kind of the catalyst, the shape of the mold and other factors, it is conducted approximately in the temperature range of −50 to 200° C., for 1 to 100 hours.

Normally, it is a common practice to start in the temperature range of 5° C. to 40° C., to raise the temperature gradually to the range of 80° C. to 130° C., and to keep at that temperature for 1 to 4 hours.

After curing is completed, a plastic polarized lens as shown in FIG. 1 is obtained by removing the lens from the lens-forming mold. Such a plastic polarized lens (10) is stacked by a resin layer (14a), a polarized film (12) and a resin layer (14b) in this order. By such a structure, peeling of the polarized film (12) from the lens material is suppressed during a process of grinding the periphery of the lens.

It is preferable that the plastic polarized lens of the present invention is subjected to an annealing treatment by heating the lens after releasing from the mold for relaxation of strain caused by polymerization. The annealing temperature is normally in the range of 80° C. to 150° C., preferably in the range of 100° C. to 130° C., more preferably in the range of 110° C. to 130° C. The annealing time is normally in the range of 0.5 to 5 hours, preferably in the range of 1 to 4 hours.

The plastic polarized lens of the present invention is used by applying a coating layer on one side or both sides, as necessary. The coating layers include a primer layer, a hard coat layer, an antireflection layer, an anticlouding layer, an antifouling layer, a water repelling layer and the like. These layers may be used alone or in multiple layers. In applying coating layers on both sides of the lens, the same coating layer or different coating layers may be applied on each surface.

In these coating layers, additives such as an ultraviolet light absorber for protecting lens and eyes from ultraviolet light, an infrared absorber for protecting eyes from infrared light, a light stabilizer or an antioxidant for improving durability of the lens, dyes and pigments for the purpose of fashionability, photochromic dyes or photochromic pigments, an antistatic agent and other known additives for improving property of the lens may be used. Various leveling agents may be used for the purpose of improving applicability of coating.

The primer layer, in general, is formed between the polarized lens substrate (the thiourethane-based resin) and the hard coat layer for the purpose of improving adhesion of the hard coat layer and improving the impact strength of the polarized lens. The thickness of the layer is normally about 0.1 to 10 µm.

The primer layer is formed, for example, by a coating method or by a drying method. In the coating method, the primer composition is coated by the known methods such as spin coating or dip coating, followed by curing to form a primer layer. In the drying method, the primer layer is formed by the known drying methods such as a CVD or a vacuum deposition method. Upon forming the primer layer, for the purpose of improving adhesiveness of the primer layer, pretreatments such as alkaline treatment, plasma treatment, ultraviolet treatment and the like may be applied as necessary.

For the primer composition, a material enabling high adhesiveness of the solidified primer composition to the lens substrate (the thiourethane-based resin) is preferable. Normally, a primer composition containing an urethane-based resin, an epoxy-based resin, a polyester-based resin, a melanin-based resin, a polyvinyl acetal and the like as the main component is used.

Although the primer composition may be used without a solvent, a suitable solvent may be used for the purpose of adjusting the viscosity of the composition and the like, as long as it does not affect the property of the lens.

A hard coat layer is used for the purpose of providing the surface of the lens with properties against abrasion, erosion, humidity, hot water, heat, weathering and the like. The thickness of the layer is normally about 0.3 to 30 µm.

The hard coat layer is formed, in general, by the known methods such as spin coating or dip coating, followed by curing. Curing methods include thermal curing or radiation curing using irradiation of energy beams such as ultraviolet or visible light. Upon forming a hard coat layer, for the purpose of improving adhesiveness of the hard coat layer, the coated surface (the lens substrate or primer layer) may be subjected to a pretreatment such as an alkaline treatment, a plasma treatment, an ultraviolet treatment and the like as necessary.

As the hard coat composition, in general, a mixture of an organosilicon compound having curing properties, with fine particles of oxides (including complex oxide fine particles) of Si, Al, Sn, Sb, Ta, Ce, La, Fe, Zn, W, Zr, In, Ti and the like is often used. Furthermore, in addition to above, amines, amino acids, complex of metal acetylacetonate, metal salts of organic acid, perchloric acid, salts of perchloric acid, acids, metal chlorides, polyfunctional epoxy compounds and the like may be used. Although the hard coat composition may be used without a solvent, a suitable solvent may be used as long as it does not affect the property of the lens.

An antireflection layer is formed on the hard coat layer as necessary. As the antireflection layer, there are inorganic-based and organic-based layers. In the case of the inorganic-based layer, the layer is formed generally by dry methods such as vacuum deposition, sputtering method, ion plating method, ion beam assist method, CVD method, and the like, by using an inorganic oxide such as $SiO_2$, $TiO_2$ and the like. In the case of the organic-based layer, in general, the layer is often formed by wet methods using a composition containing an organosilicon compound and silica-based fine particles having internal pores.

The antireflection layer may be a single layer or a multiple layer. When using as a single layer, it is preferable that refractive index is lower by at least 0.1 or more than that of the hard coat layer. In order to develop antireflection function effectively, a multiple antireflection layer is preferable, wherein normally a low refractive layer and a high refractive layer are stacked alternately. In this case, it is also preferable that the difference in the refractive index of the low refractive layer and the high refractive layer is 0.1 or more. As the high refractive layer, for example, layers of ZnO, $TiO_2$, $CeO_2$, $Sb_2O_5$, $SnO_2$, $ZrO_2$, $Ta_2O_5$ and the like are used. As the low refractive layer, $SiO_2$ layer and the like is used. The thickness of the layer is normally approximately 50 to 150 nm.

Furthermore, the plastic polarized lens of the present invention may be subjected to a treatment such as grinding the back surface, antistatic treatment, coloring, light adjustment and the like as necessary.

Since such a plastic polarized lens may be formed in a small thickness, it is useful as a polarized lens for eyeglasses, particularly as the lens for correcting visual acuity.

It is apparent that the present invention is not limited to the above embodiment, and may be modified and changed without departing from the scope and spirit of the invention.

EXAMPLES

The present invention is explained further in detail with reference to examples. However, the present invention is in no way restricted by these examples.

The property tests of the polarized lens were conducted according to the following methods.

(A) Adhesiveness of the Polarized Film

This evaluation item corresponds to a periphery grinding process in which the periphery of polarized lens is grinded and removed after molding to stereotype the side face of the lens. The Autolensedger Type No. ALE-100DX (produced by TOPCON Corp.) was used for this test. The polarized lens to be tested is clamped at both sides to hold it, and while rotating it in parallel to the face of the lens, a separately set ceramic chip is moved to the side face of the lens, and contacted to grind entirely the side face and the periphery of the polarized lens was removed. If adhesiveness between the polarized film and the hardened lens is not sufficient, peeling of the polarized film takes place. Namely, adhesiveness was evaluated by observing the state of peeling of the polarized film laminate at the periphery of the lens according to the following criteria:

A: Good adhesion;
B: Good adhesion, but with slight peeling observed;
C: Bad adhesion.

(B) Visibility of a Polarized Film in the Lens

Although visibility may be evaluated under the light in normal life environment, in order to simplify the environmental light factor as much as possible, the evaluation was made according to the following method.

In a dark room where other light source may be neglected, the polarized lens to be tested was placed just 150 cm below a lighted 37 watt fluorescent lamp of 120 cm length set above, the image of the fluorescent lamp is observed by looking at the concave surface of the lens from the direction as vertical as possible to the surface, at approximately 30 cm above the lens, having the lens in the horizontal position turning the concave face of the lens toward the lamp, while supporting side face of the lens by hand so that no hindrance exists on both side face of the lens. In addition, the image is observed while slightly changing the angle of the lens from a horizontal position. Two kinds of clear, large and small images are observed in common. When the polarized film is conspicuous, another vague image may be observed. Visibility of the polarized film was rated in terms of the following criteria:

a: Almost no vague image is seen,
b: A vague image is slightly seen but not expanded,
c: A vague image fluctuates, expanded and conspicuous.

(C) Water Resistance

The lens to be tested was dipped in a constant temperature water bath kept at 60° C., and at every preset interval, 3 kinds of lenses were taken out and changes were observed. When water-resistance is not sufficient, whitening or decoloration-like deterioration was observed progressing from the periphery to the center of the lens with time of dipping (data obtained after 4 hours, 3 days and 7 days). The length of the deteriorated part from the periphery to the center of the lens was measured using a vernier caliper.

(D) Refractive Index of the Lens Material

The refractive index of a piece of a resin (the lens material) molded without the polarized film was measured for the e-line at 20° C. using a Pulfrich refractometer.

(E) Viscosity

The viscosity of a monomer mixture for injection was measured using a B-type viscometer at 20° C.

Example 1

An impregnating solution was prepared by dissolving 10 g of 3-methacryloxypropyl trimethoxysilane (produced by Shin-Etsu Chemical Co., Ltd., product name: KBM503) as a silane coupling agent in 10 L of methanol just before use, into which 2.0 g of water was added with stirring. A polarized film containing polyethylene terephthalate with protection films on both sides (produced by Mitsui Chemicals, Inc., registered trade mark "POLASOLA", thickness of 130 μm) was subjected to form a curvature of 2R with a thermal press method. The polarized film was cut to meet the size of the mold, the protection films on both sides were peeled off, the cut specimen was dipped vertically in the above mentioned impregnating solution, quickly taken out and held vertically for 1 minute to drip out the liquid. Then, the specimen was dried in a drying oven with air blower at 50° C. for 10 minutes to prepare a polarized film. This film was inserted and set in a mold (glass mold set) as shown in FIG. 2 (front: 2R, rear: 6R, diopter: S-5.00).

On the other hand, 50.6 parts by weight of m-xylylene diisocyanate, and 49.4 parts by weight of a mixture composed of 4,8-dimercaptomethyl-1,1'-dimercapto-3,6,9-trithiaundecane, 4,7-dimercaptomethyl-1,11-dimercapto-3,6,9-trithiaundecane, and 5,7-dimercaptomethyl-1,1'-dimercapto-3,6,9-trithiaundecane, 0.01 parts by weight of dibutyltin dichloride as an accelerator, 0.1 parts by weight of Zelec UN (Registered trade mark, produced by Stepan Company) as a mold releasing agent, and 0.05 parts by weight of Seesorb 709 (produced by Shipro Kasei Kaisha, Ltd.) as an ultraviolet light absorber were dissolved by stirring, followed by degassing under vacuum to provide a monomer mixture for injection immediately after preparation. The viscosity of the mixture after stirring for 1 hour for dissolution was 30 mPa·s at 20° C.

Subsequently, the monomer mixture was injected, after filtering with 3 μm filter, through a tube into two spaces (24a) and (24b) partitioned by glass molds (22a) and (22b) in a lens-forming mold and a polarized film (12). The distance of separation (a) in the narrowest space (24a) was approximately 0.5 mm. After injection, the mold (20) was capped and placed in a hot air circulation type oven, and heated up from 25° C. to 120° C. in 16 hours. After it was maintained at 120° C. for 4 hours, it was cooled down gradually and the lens-forming mold was taken out from the oven. The formed lens was released from the lens-forming mold and annealed at 130° C. for 2 hours to obtain a polarized lens. The results of property tests of the polarized lens are shown in Table-1.

Example 2

An impregnating solution was prepared by dissolving 10 g of 3-methacryloxypropyltrimethoxysilane (produced by Shin-Etsu Chemicals Co., Ltd., product name: KBM503) as a silane coupling agent in 10 L of methanol just before use, into which 2.0 g of water was added with stirring. A polarized film containing polyethylene terephthalate with protection films on both sides (produced by Mitsui Chemicals, Inc., registered trade mark "POLASOLA", thickness of 130 μm) was subjected to form a curvature of 2R with a thermal press method. The polarized film was cut to meet the size of the mold, the protection films on both sides were peeled off, the cut specimen was dipped vertically in the above mentioned impregnating solution, quickly taken out and held vertically for 1 minute to drip out the liquid. Then, the specimen was dried in a drying oven with air blower at 50° C. for 10 minutes to prepare a polarized film. This film was inserted and set in a mold (glass mold set) as shown in FIG. 2 (front: 2R, rear: 6R, diopter: S-5.00).

On the other hand, 50.6 parts by weight of bis(isocyanatomethyl)bicyclo[2.2.1]heptane (a mixture of 2,5-isomer and 2,6-isomer), 23.9 parts by weight of pentaerythritol tetrakis(3-mercaptopropionate), 25.5 parts by weight of 4-mercaptomethyl-1,8-dimercapto-3,6-dithiaoctane, 0.02 parts by weight of dibutyltin dichloride as a accelerator, 0.13 parts by weight of Zelec UN (Registered trade mark, produced by Stepan Company) as a mold releasing agent, and 0.05 parts by weight of Seesorb 709 (produced by Shipro Kasei Kaisha, Ltd.) as an ultraviolet light absorber were dissolved by stirring, followed by degassing under vacuum to provide a monomer mixture for injection immediately after preparation. The viscosity of the mixture after stirring for 1 hour for dissolution was 40 mPa·s at 20° C.

Subsequently, in the same manner as Example 1, the monomer mixture was injected after filtering with 3 μm filter, through a tube into two spaces (24a) and (24b) partitioned by glass molds (22a) and (22b) in a lens-forming mold and a polarized film (12). After injection, the mold was capped and placed in a hot air circulation type oven, and heated up from 20° C. to 130° C. in 26 hours. After it was maintained at 130° C. for 4 hours, it was cooled down gradually and the lens-forming mold was taken out from the oven. The formed lens was released from the lens-forming mold and annealed at 130° C. for 2 hours to obtain a polarized lens. The results of property tests of the polarized lens are shown in Table-1.

Example 3

A polarized film containing polyethylene terephthalate with protection film on one side (produced by Mitsui Chemicals, Inc., registered trade mark "POLASOLA", thickness of 130 μm) was formed into a curvature of 2R with a thermal press method. After the polarized film was cut to meet the size of the mold, the protection film was peeled off, and the film was dipped in an aqueous solution of 20 wt % sodium hydroxide heated at 40° C. After 30 minutes, the film was taken out and washed with water, and subsequently washed with methanol and air-dried to obtain a polarized film. This film was inserted and set in a mold for polarized lens molding as shown in FIG. 2, and the same process was conducted as in Example 1 to obtain a polarized lens.

The results of property test of the obtained polarized lens were shown in Table 1.

Example 4

From a polarized film containing polyethylene terephthalate with protection film on one side (produced by Mitsui Chemicals, Inc., registered trade mark "POLASOLA", thickness of 130 μm), the protection film is peeled off and the resultant polarized film was formed into a curvature of 2R with a thermal press method. After the polarized film was cut to meet the size of the mold, the film was dipped in an aqueous solution of 20 wt % sodium hydroxide kept at 40° C. After 30 minutes, the film was taken out and washed with water, and subsequently washed with methanol and air-dried. The film was further subjected to treatment using a plasma treatment unit (produced by Keyence Corp. Type ST-7000) under strong output for around 11 seconds in an air atmosphere to obtain a polarized film. This polarized film was inserted and set in a mold for molding polarized lens as shown in FIG. 2, and the same process was conducted as in Example 1 to obtain a polarized lens.

The results of property test of the obtained polarized lens were shown in Table 1.

Example 5

From a polarized film containing polyethylene terephthalate with protection film on one side (produced by Mitsui Chemicals, Inc., registered trade mark "POLASOLA", thickness of 130 μm), the protection film was peeled off and the resultant polarized film was formed into a curvature of 2R with a thermal press method. After the polarized film was cut to meet the size of the mold, the film was dipped in an aqueous solution of 20 wt % sodium hydroxide kept at 40° C. After 30 minutes, the film was taken out and washed with water, and subsequently washed with methanol and air-dried. The film was further subjected to treatment using a vacuum plasma treatment unit (produced by March Plasma Systems PCB type output 2000 W) under strong output for around 300 seconds under vacuum to obtain a polarized film. This film was inserted and set in a mold for molding polarized lens as shown in FIG. 2, and the same process was conducted as in Example 1 to obtain a polarized lens.

The results of property test of the obtained polarized lens were shown in Table 1.

Example 6

A polarized film containing polyethylene terephthalate with protection film on one side (produced by Mitsui Chemicals, Inc., registered trade mark "POLASOLA", thickness of 130 μm) was formed into a curvature of 2R with a thermal press method. The polarized film was cut to meet the size of the mold, the protection film was peeled off, and both sides of the polarized film were subjected to scanning treatment three times under the conditions of 200 W·min/m2, 0.5 cm spacing, using a corona discharge unit (produced by Kasuga Electric Co. Ltd.) to obtain a polarized film. This film was inserted and set in a mold for molding polarized lens as shown in FIG. 2, and the same process was conducted as in Example 1 to obtain a polarized lens.

The results of property test of the obtained polarized lens were shown in Table 1.

Example 7

From a polarized film containing polyethylene terephthalate with protection film on one side (produced by Mitsui Chemicals, Inc., registered trade mark "POLASOLA", thickness of 130 μm), the protection film was peeled off, and the resultant polarized film was coated on both sides with urethane resin solution type coating material, and dried at about 50 to 60° C. This film was formed into a curvature of 2R with a thermal press method, and was cut to meet the size of the mold to obtain a polarized film. This film was inserted and set in a mold for molding polarized lens as shown in FIG. 2, and the same process was conducted as in Example 1 to obtain a polarized lens.

The results of property test of the obtained polarized lens were shown in Table 1.

Example 8

A polarized film containing polyethylene terephthalate with protection film on one side (produced by Mitsui Chemicals, Inc., registered trade mark "POLASOLA", thickness of 130 μm) was formed into a curvature of 2R with a thermal press method. This polarized film was cut to meet the size of the mold, and the protection film was peeled off. This polarized film was inserted and set in a mold for molding polarized lens as shown in FIG. 2, and conducted the same process as in Example 1 to obtain a polarized lens.

The results of property test of the obtained polarized lens were shown in Table 1.

Comparative Example 1

Polyvinyl alcohol (Kuraray vinylon #750 produced by Kuraray Co., Ltd.) was dyed in an aqueous solution of a dichromic dye and stretched in the solution. Then, the film was dried for a short time at room temperature, and was heat-treated at 40° C. for 3 minutes to obtain a polarized film having a thickness of 40 μm. The obtained polarized film was subjected to form a curvature of 2R with a thermal press method, cut to meet the mold shape, placed in a constant temperature and humidity chamber for humidity conditioning, and it was placed in a hot air circulation type oven at 60° C. for 2 hours and placed immediately in a lens forming mold (glass mold set).

Thereafter, a polarized lens was obtained in the same manner as in Example 1.

The results of the property tests of the obtained lens are shown in Table 1.

sibility of producing a thin lens because of the low viscosity during injection to a mold.

The plastic polarized lens of the present invention is excellent in processing characteristics and suitable for a polarized lens for eyeglasses.

What is claimed is:

1. A method of producing a plastic polarized lens, comprising:
    fixing a polarized film comprised of a thermoplastic polyester in a lens-forming mold in a state separated from an inner wall of said mold;
    injecting a mixture in which the viscosity at 20° C. is 200 mPa·s or less into a space between both surfaces of said polarized film and said inner wall of said mold; and
    stacking layers comprised of a thiourethane resin on both surfaces of said polarized film by polymerizing and curing said mixture,
    wherein said mixture containing contains:
    (A) at least one kind of diisocyanate selected from the group consisting of 2,5-bis(isocvanatomethyl)bicyclo[2.2.1]heptane, 2,6-bis(isocyanatomethyl)bicyclo[2.2.1]heptane and m-xylylene diisocyanate, and
    (B) at least one kind of polythiol compound selected from the group consisting of pentaerythritoltetrakis(3-mercaptopropionate), 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, 1,1,3,3-tetrakis(mercaptomethylthio)propane, 4,6-bis(mercaptomethylthio)-1,3-dithiane and 2-(2,2-bis(mercapto methylthio)ethyl)-1,3-dithietane,
    wherein the narrowest distance of said space is 0.2 to 2.0 mm.

2. The method of producing a plastic polarized lens according to claim 1,
    wherein said thermoplastic polyester is polyethylene terephthalate.

3. The method of producing a plastic polarized lens according to claim 1,
    wherein said polarized film is treated in advance with one or two or more processes selected from the group consisting of a treatment with a silane coupling agent, a treatment with an aqueous solution of sodium hydrox-

TABLE 1

| | Viscosity of the mixture after stirring for 1 hour for dissolution at 20° C. (mPa·s) | (A) Adhesiveness of polarized film | (B) Visibility of polarized film in lens | (C) Water resistance (length of deteriorated part from periphery to center (mm)) | | | (D) Refractive index of lens material |
|---|---|---|---|---|---|---|---|
| | | | | After 4 hours | After 3 days | After 7 days | |
| Example 1 | 30 | A | a | 0.0 | 0.0 | 0.0 | 1.67 |
| Example 2 | 40 | A | b | 0.0 | 0.0 | 0.0 | 1.60 |
| Example 3 | 30 | A | a | 0.0 | 0.0 | 0.0 | 1.67 |
| Example 4 | 30 | A | a | 0.0 | 0.0 | 0.0 | 1.67 |
| Example 5 | 30 | A | a | 0.0 | 0.0 | 0.0 | 1.67 |
| Example 6 | 30 | A | a | 0.0 | 0.0 | 0.0 | 1.67 |
| Example 7 | 30 | A | a | 0.0 | 0.0 | 0.0 | 1.67 |
| Example 8 | 30 | B | a | 0.0 | 0.0 | 0.0 | 1.67 |
| Comparative Example 1 | 30 | A | c | 0.2 | 1.5 | 3.0 | 1.67 |

From the above results, it was confirmed that the polarized lens of the present invention has excellent water resistance, has a clear appearance due to dissolution of the film in the lens, has no peeling problem of the polarized film in the downstream process of grinding the periphery, and has poside, an atmospheric or vacuum plasma treatment, a corona discharge treatment, and a coating treatment with an urethane based-resin.

* * * * *